United States Patent [19]
Luebke et al.

[11] Patent Number: 5,598,769
[45] Date of Patent: Feb. 4, 1997

[54] COOKING OVEN

[75] Inventors: Clement J. Luebke, Indian Rocks Beach; Keith A. Stanger, New Port Richey, both of Fla.

[73] Assignee: Foodservice Equipment, Engineering & Consulting, Inc., Oldsmar, Fla.

[21] Appl. No.: 429,059

[22] Filed: Apr. 26, 1995

[51] Int. Cl.⁶ .................. A47J 37/04; A21B 1/08
[52] U.S. Cl. .................. 99/395; 99/401; 99/421 H; 99/427; 99/447; 99/476; 99/479
[58] Field of Search .................. 99/393, 395, 401, 99/421 R, 421 H, 421 HH, 427, 447, 476, 477, 479; 126/21 A, 41 A, 41 B; 219/400

[56] References Cited

U.S. PATENT DOCUMENTS

| | | |
|---|---|---|
| 2,577,184 | 12/1951 | Dietrich et al. . |
| 3,413,912 | 12/1968 | Phelan et al. . |
| 3,529,582 | 9/1970 | Hurko et al. . |
| 3,828,760 | 8/1974 | Farber et al. ............ 126/21 A |
| 3,926,106 | 12/1975 | Deusing et al. ............ 99/447 |
| 4,214,516 | 7/1980 | Friedl et al. ............ 99/447 |
| 4,317,441 | 3/1982 | Berg ............ 126/41 R |
| 4,395,233 | 7/1983 | Smith et al. ............ 99/447 |
| 4,561,348 | 12/1985 | Halters et al. ............ 99/421 H |
| 4,724,823 | 2/1988 | Simpson ............ 99/447 |
| 5,016,605 | 5/1991 | LaForet et al. ............ 99/447 |
| 5,373,778 | 12/1994 | Moreth ............ 99/421 H |
| 5,445,064 | 8/1995 | Lopata ............ 99/421 H |

OTHER PUBLICATIONS

Franklin–Southern Pride, Chicken Rotisserie—32 Bird, Mar. 1993 (3 pages including cross section).
Vulcan–Hart Corporation, Gas, Convection Ovens, 1989; 7 pages.

*Primary Examiner*—David Scherbel
*Assistant Examiner*—Reginald L. Alexander
*Attorney, Agent, or Firm*—Polster, Lieder, Woodruff & Lucchesi, L.C.

[57] ABSTRACT

A cooking oven has a housing and walls which enclose an oven chamber in which a rotisserie supports food to be cooked. The heat for cooking the food derives from a burner having a plenum and tiles in front of the plenum, with the tiles being exposed to the oven chamber along the upper wall of the chamber and near the rear of the chamber. A removable baffle fits into the oven chamber along the upper wall ahead of the burner and it forms an air duct in which two blowers revolve. The blowers draw air from within chamber into the duct and forces it out of the duct downwardly so that it impinges on the food as the food passes beneath the discharge region of the duct. A deflector keeps the air so discharged for disturbing the flame along the tiles of the burner.

27 Claims, 6 Drawing Sheets

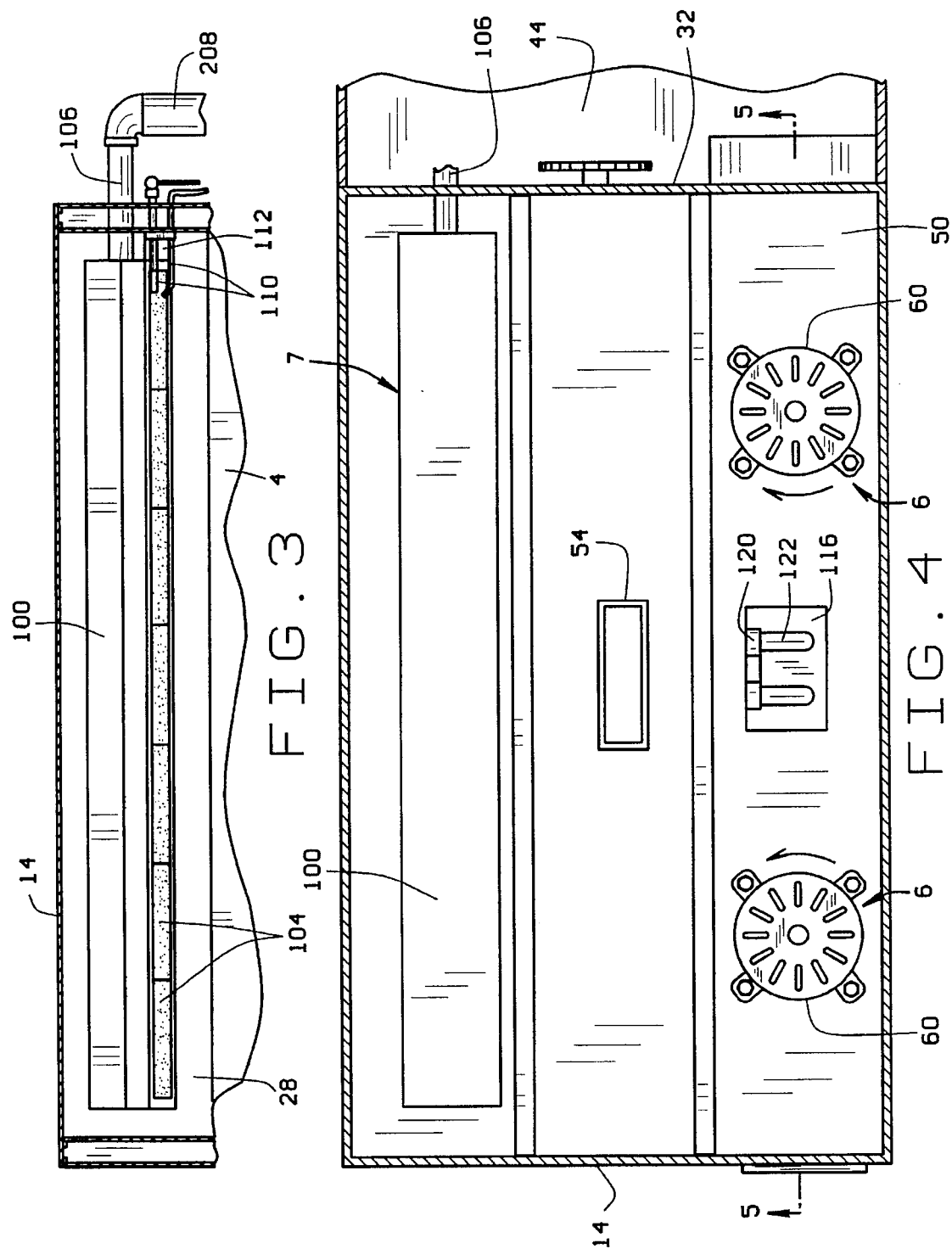

COOKING OVEN

BACKGROUND OF THE INVENTION

This invention relates in general to ovens for preparing food and more particularly to an oven which relies on both heated forced air and radiant energy to cook or otherwise prepare the food.

So-called convection ovens, which use a fan to force air into circulation within an oven chamber, have found widespread acceptance in the food preparation industry, particularly in retail food stores and restaurants which specialize in having cooked food available for immediate order. Typically, these ovens rely on electrical heating elements to heat the air which is circulated, and in some the electrical heating elements are arranged such that they are also exposed to the food so that radiant energy from the elements likewise cooks the food. U.S. Pat. Nos. 3,828,760 and 4,561,348 disclose such ovens. The electrical demands of these ovens are indeed substantial. They operate on elevated voltages and draw considerable current, sometimes multiphase, and thus cannot be serviced with conventional electrical circuits. They require special circuits and often special electrical service to the buildings in which they are located. Gaseous fuels heat more efficiently, and while a gas-fired oven requires a gas line, that is often more easily installed than the specialized electrical service required for electrically-heated ovens. But gas burners are rarely found within the cooking chambers of convection ovens, because the forced air makes the flame difficult to ignite and, once the flame is lit, the forced air tends to lift it away from the burners and extinguish it. Also, while one can easily control an electrical oven by connecting its heating elements across an electrical energy source at desired intervals, a gas burner is not so easily controlled.

The more sophisticated convection ovens contain rotisseries which move the food through an orbital path so that no one item under preparation remains in a specific location as it is cooked. Since the temperature of the heated convection air may vary within the oven chamber and the radiant energy may vary even more so within the chamber, the constant rotation results in more uniform cooking of the food. Many rotisseries hold the food on spits as it is cooked, and of course, the spits undergo the orbital movement as the rotisserie turns about its axis. In some rotisseries the spits rotate about their own axes as the rotisserie itself revolves about its primary axis, and this double rotation provides even more uniform cooking, particularly where the oven contains a source of radiant energy, since each revolution of the rotisserie exposes a different surface of the food on any spit to the source of radiant energy.

Double rotation creates complexities of its own. Usually it is derived from a planetary gear system embodied in the rotisserie, with the planet gears being carried by a drive wheel that holds one end of each spit, while the other end is supported on a slave wheel. The planet gears mesh with a ring gear. Any distortion of the drive wheel by a temperature differential in it affects the mesh between the planet gear and ring gear and may cause excessive wear or perhaps binding. Moreover, distortion in the drive and slave wheels may actually separate a spit from the wheels, causing the spit to fall to the bottom of the oven chamber.

The typical rotisserie derives its rotation from a drive motor which is located outside the oven chamber and operates with conventional alternating current. As a consequence, it turns quite rapidly—indeed much faster than the 3 to 5 rev/min imparted to the drive wheel. The reduction is usually achieved in a gear box, but to achieve a reduction of that character in a single and highly compact gear box requires small gears with small teeth. Occasionally these gears fail when the planetary gears bind or in some rare cases when the rotisserie encounters a substantial imbalance.

Apart from that, spit rotation at a velocity suitable for cooking will leave a food product, such as chicken, that carries a coating or contains juices, with circumferential stripes if the rotation continues after the food product is cooked. The coatings and juices tend to remain on the surface of chicken, while flowing downwardly over the chicken, thus imparting the stripes. And many operators of these ovens hold the product in them far after they are cooked to keep them warm and to present an attractive display.

The display typically involves some type of illumination—usually quartz bulbs—within the oven chamber. Juices from the cooked food product become entrained in the forced air and coat the bulbs, rendering them less effective and causing early failure. Sometimes the bulbs break and shower glass into the food product. Moreover, the bulbs are difficult to clean.

The present invention resides in a cooking oven which utilizes forced convection air and radiation for cooking food, with the heat for elevating the temperature of the convection air and the radiant energy being derived from a gas burner. The burner has two stages so that it may be fired at two different energy levels, yet it is isolated sufficiently from the air stream to maintain a dependable and uniform flame. The invention also resides in a planetary-type rotisserie having a motor that operates at variable speeds and is isolated from the axle of the rotisserie with a chain drive or the like. The wheels of the planetary-type rotisserie have flanges which prevent distortion, even in the presence of extreme temperature differentials. Illumination for the oven chamber derives from lamps located in a light box covered with flat glass that will withstand extreme temperature differentials. The invention also consists in the parts and in the arrangements and combinations of parts hereinafter described and claimed. The cooking parameters exist within a programmable controller, and it operates the variable speed drive, the two-stage burner and sets the cooking time and temperature to meet those parameters—and once the cooking is complete operates the oven in a hold condition to keep the cooked food warm and in a condition to be served.

DESCRIPTION OF THE DRAWINGS

In the accompanying drawings which form part of the specification and wherein like numerals and letters refer to like parts wherever they occur:

FIG. 3 is a fragmentary sectional view of the oven taken along line 3—3 of FIG. 2 and illustrating the burner;

FIG. 4 is a sectional view taken along line 4—4 of FIG. 2 and illustrating the upper part of the oven above the oven chamber;

DETAILED DESCRIPTION

Figure 1:
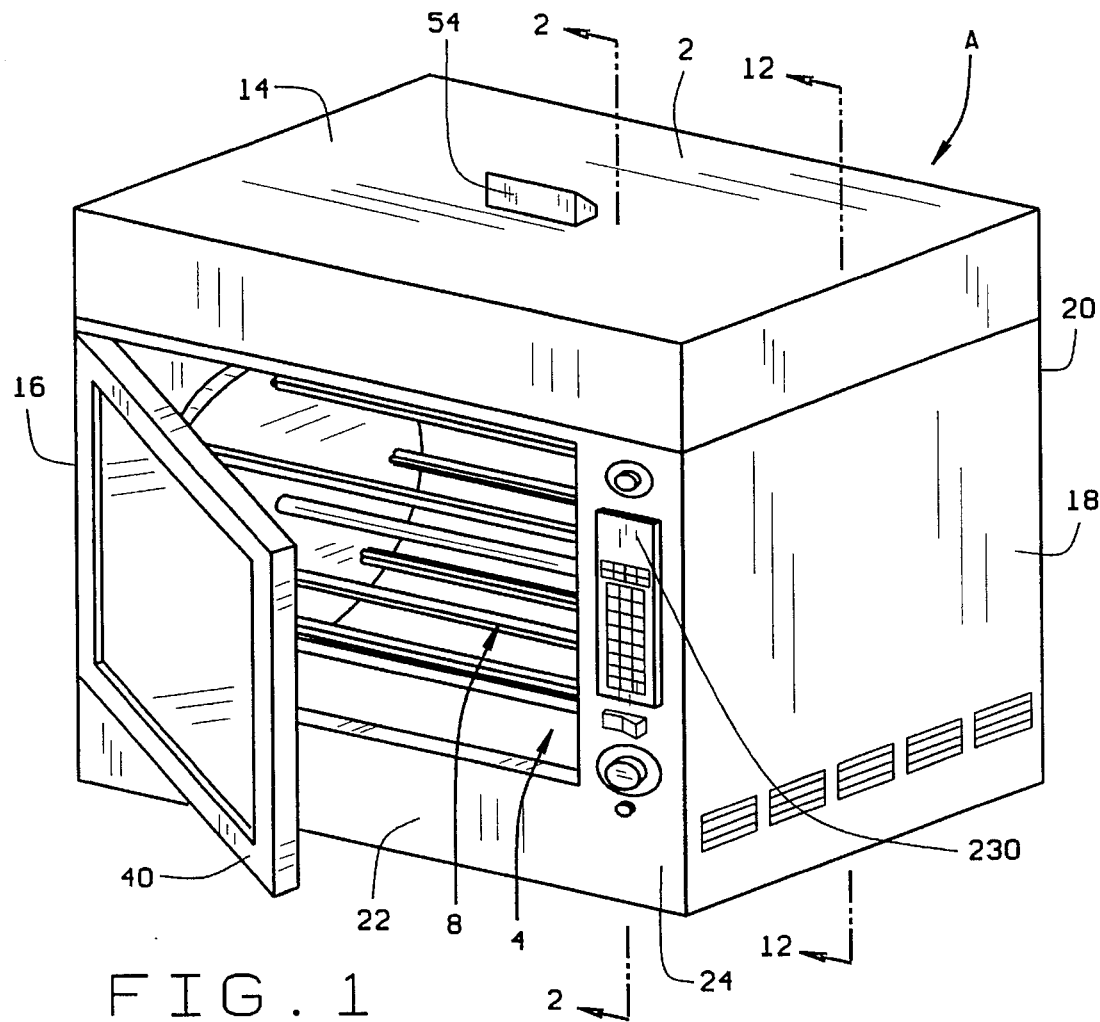
FIG. 1. is a perspective view of the cooking oven constructed in accordance with embodying the present invention.
Figure 8:
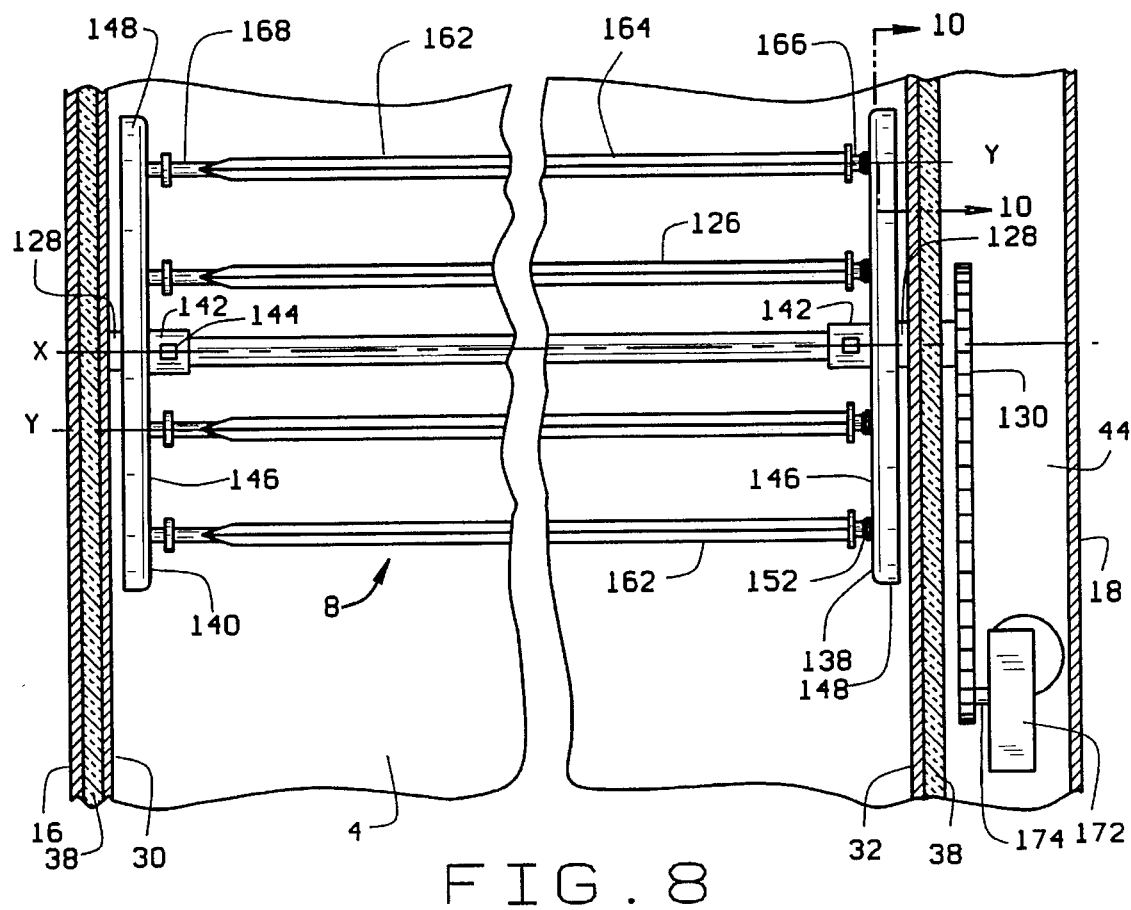
FIG. 8 is a vertical sectional view of the oven taken along line 8—8 of FIG. 2 and showing the rotisserie.

Referring now to the drawings, a cooking oven includes (FIGS. 1 & 2) a housing 2 which surrounds a cooking chamber 4 where a food product, such as poultry or other meat, is cooked through the combined effect of forced air at elevated temperatures and radiant energy. The forced air circulation, which is typically called "convection", derives from a blower unit 6 located in the upper part of the oven chamber 4. The heat for elevating the temperature of the circulating or convection air and for producing the radiant energy derives from a gas-fired burner 7 that is exposed to the cooking chamber 4, yet maintains a flame in the chamber 4 in the presence of the forced air flow within the chamber 4. The oven A also includes a rotisserie 8 (FIGS. 2 & 8) which carries the food around a fixed primary axis X that extends through the chamber 4 and further rotates the food about several remote axes Y, all to achieve uniform cooking. Finally, the oven A has a light assembly 9 which provides illumination for the oven chamber 4 to better display food that is cooked or held in it.

The housing 2 contains a frame 10 (FIG. 2) that possesses an orthogonal or box-like configuration which supports several exterior walls, namely a bottom wall 12, a top wall 14, left and right end walls 16 and 18, a back wall 20, and bottom and control panels 22 and 24 at its front. The top wall 14 not only covers the top of the frame 10, but also encloses the upper regions of the frame 10 above the cooking chamber 4. In this regard, it extends downwardly a short distance at its front, back and ends to meet the two end walls 16 and 18 and the back wall 20. The oven chamber 4 lies within the housing 2 where it is enclosed in part by (FIGS. 2 & 8) a bottom wall 26, a top wall 28, left and right and end walls 30 and 32, and a back wall 34, all of which are set inwardly from their counterparts on the housing 2. Extended across the front of the chamber 4 in front of the bottom panel 22 of the housing 2 is a front panel 36. The spacing between the housing 2 and oven chamber 4 at the two bottom walls 12 and 26, at the two left end walls 16 and 30, at the back walls 20 and 34, and at the front panels 22 and 36, is relatively small, and this space is occupied by a glass fiber or similar thermal insulation 38. The front of the oven chamber 4 is open in the sense that it is not closed by a separate oven chamber wall, but it is closed by a door 40 (FIGS. 1 & 2) which is hinged to the frame 10 at the front margin of the left end wall 16 for the housing 2. The door 20, which is formed from a heat resistant glass panel enclosed within a metal frame, closes the space between the left end wall 16 and control panel 24 and the space between the downwardly turned portion at the front of the top wall 14 and the bottom front panel 22, save for an air slot 42 about ¾ inches high between the lower margin of the door 40 and the upper margin of the bottom front panel 22. More insulation 38 lies along the top wall 14 and right end wall 32 of the oven chamber 4, but it is set inwardly from the top wall 14 and right end wall 18, respectively, of the housing 2.

Figure 12:
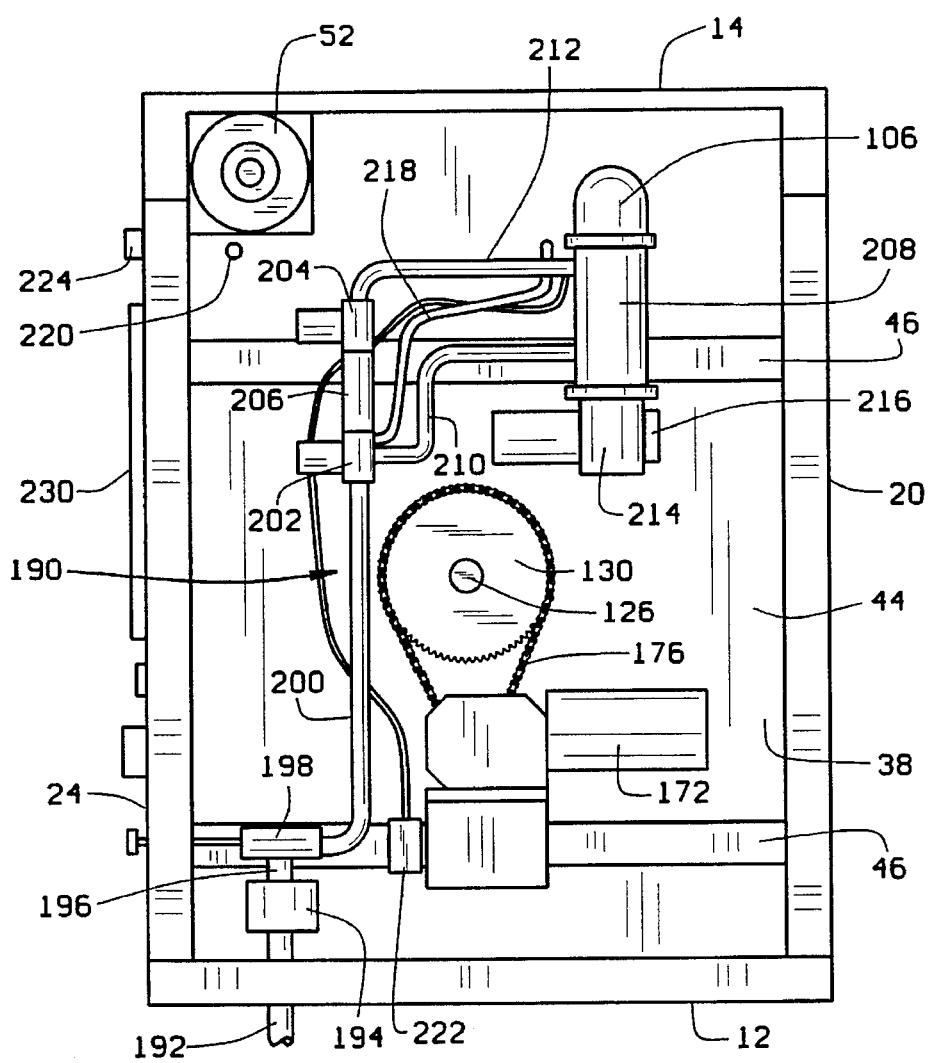
FIG. 12 is an end sectional view taken along line 12—12 of FIG. 1 and showing the equipment compartment for the oven.

The space between the two right end walls 18 and 32 forms an equipment compartment 44 (FIG. 12) in which several of the components for operating the oven A exist. Indeed, here the frame 10 has cross members 46 which support the components. In the region between the two top walls 14 and 28, the frame 10 has longitudinal members 48, two of which create an air channel 50 over the top of the oven chamber 4 at its front. One end of the channel 50 opens into the equipment compartment 44, and here the frame 10 is fitted with a small fan 52 which draws air from the equipment compartment 44 and discharges it into the air channel 50. The right end wall 18 of the housing 2 near its bottom has louvers which admit air to the equipment compartment 44, while the top wall 14 of the housing, in its downwardly turned portion above the left end wall 16, contains more louvers which allow the air directed into the air channel 50 to escape. The space between the two top walls 14 and 28 further accommodates a stack 54 (FIG. 2) which leads from the approximate center of the top wall 28 for the oven chamber 4, through the space and out through the top wall 14 of the housing 2. The stack 54 serves as a vent for the oven chamber 4, allowing air to escape and the products of combustion to escape, to be replaced with fresh air drawn in through the air slot 42.

Figure 2:
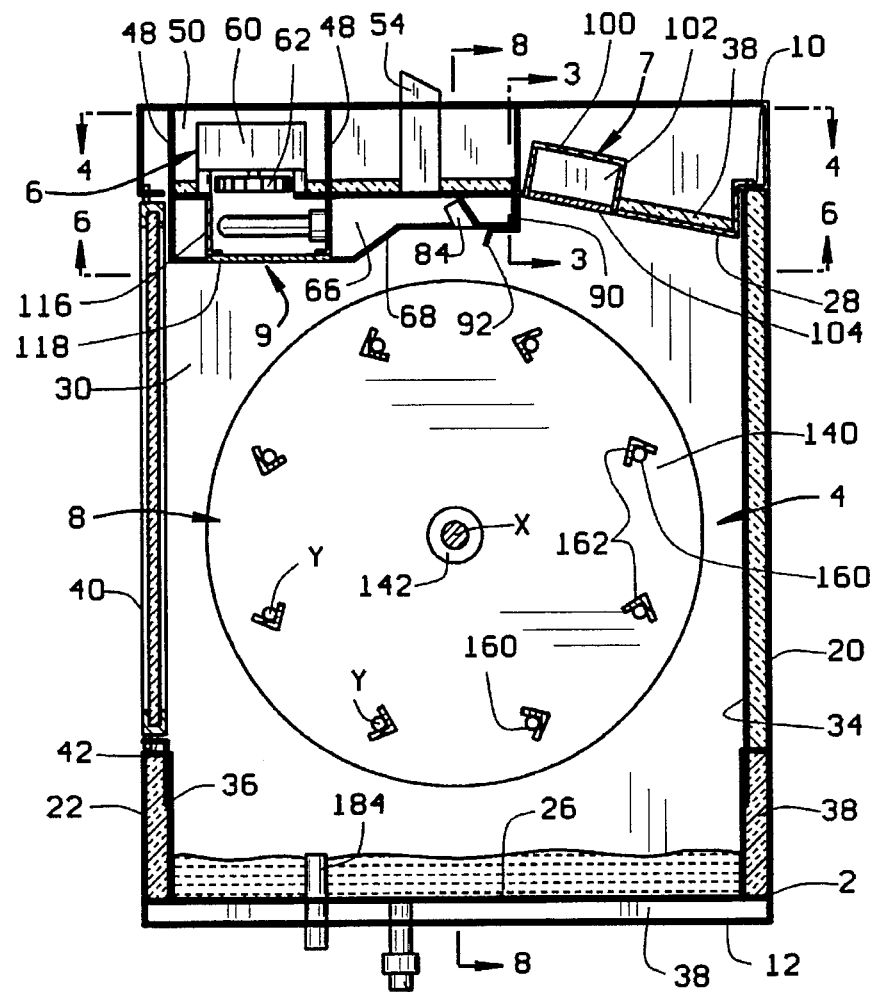
FIG. 2. is a vertical cross-sectional view of the oven taken along line 2—2 of FIG. 1.
Figure 5:
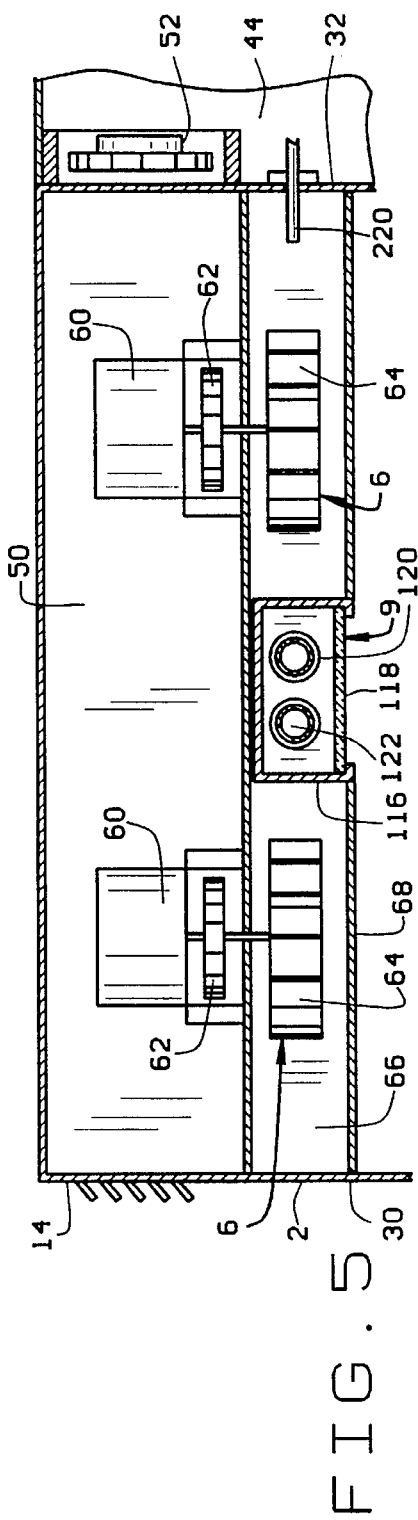
FIG. 5 is a sectional view of the oven taken along line 5—5 of FIG. 4 and illustrating the air channel above the oven chamber, as well as the air duct within the oven chamber.
Figure 6:
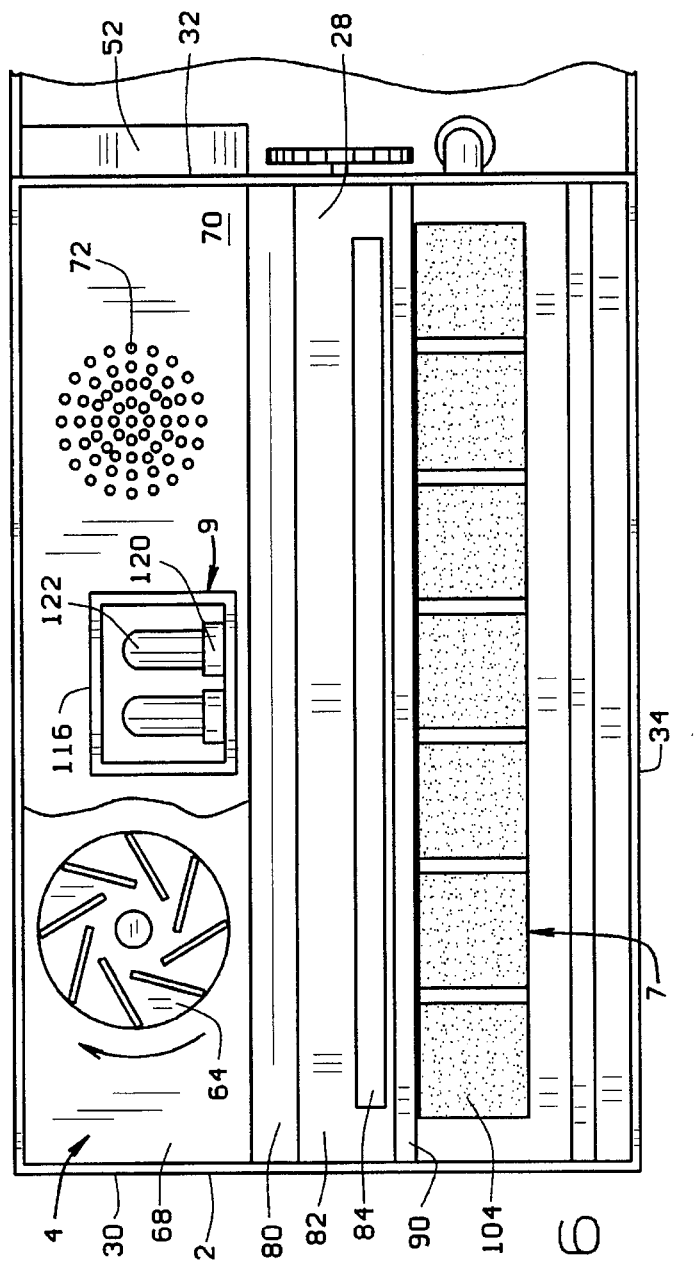
FIG. 6 is a horizontal sectional view taken along line 6—6 of FIG. 2 and illustrating the underside of the baffle in the oven chamber, the top wall of the oven chamber, and the burner in the top wall.

The blower unit 6 resides for the most part in the upper and forward region of the oven chamber 4, but it includes electric motors 60 which are located in the air channel 50 above the oven chamber 4 (FIGS. 2, 4 & 5). Each electric motor 60 is mounted somewhat above the floor of the channel 50 with its shaft extended vertically. Indeed, the shafts for the two motors 60 extend downwardly through the top wall 28 of the oven chamber 4. Immediately above the wall 28 the shaft of each motor 60 carries a small fan 62 which draws air from the channel 50 along its motor 60 and serves to cool the motor 60, thus protecting critical motor components such as bearings. Immediately below the top wall 28, the shaft of each motor 60 supports a larger blower wheel 64 (FIGS. 5 & 6) consisting of a disk and vanes projecting downwardly from the disk, with the vanes being arranged circumferentially in the backwardly inclined orientation. Actually, the blower wheels 64 rotate in opposite directions (FIGS. 4 & 6—arrows) within a forced air duct 66 that is enclosed on its top by the top wall 28 of the oven chamber 4, on its ends by the end walls 30 and 32 of the oven chamber 4 and along its front, bottom and rear by a baffle 68.

Figure 7:
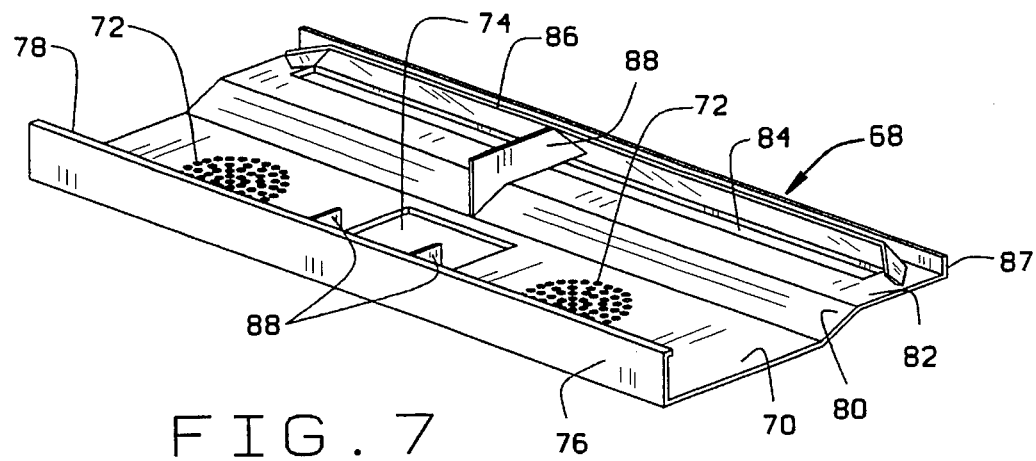
FIG. 7 is a perspective view of the baffle removed from the oven chamber.

To this end, the baffle 68 has (FIGS. 2 & 7) a lower panel 70 which lies directly beneath the blower wheels 64 and has apertures 72 in the region of the blower wheels 64, so that when the wheels 64 rotate, their vanes draw air through the apertures 72 into the duct 66 and discharge it radially, within the duct 66. Thus, the apertures serve as an inlet for the duct 66. The lower panel 70 also has a cutout 74 located between the sets of apertures 72 to accommodate the light assembly 9. Along its front margin the lower panel 70 merges into a short front panel 76 which in turn merges into a rearwardly turned lip 78 that engages the frame 10 to hold the baffle 68 within the chamber 4. Beyond the apertures 72 the lower panel 70 merges into an oblique panel 80 which in turn merges into a short discharge panel 82 that lies parallel to the lower panel 70, but is offset upwardly from it, although not as high as the lip 78. The discharge panel 82 contains a slot 84 which extends almost its full length and serves as the outlet for the duct 66. The panel 82 carries a deflector 86 which lies behind the slot 84 for the full length of the slot 84. The deflector 86 projects obliquely toward the top wall 28 of the oven chamber 4, and indeed its upper margin lies along the top wall 28. The orientation of the deflector 86 is such that it directs air moving through the duct 66 into the slot 84 and thence into the oven chamber 4 generally midway between the back wall 34 at the rear of the chamber 4 and the door 40 at the front of the chamber 4. Along the rear of the discharge panel 82, the baffle 68 has another short lip 87 which is directed upwardly and lies along the top wall 28 of the oven chamber 4.

Both ahead of and behind the cutout 74, the baffle 68 is fitted with vanes 88 (FIG. 7) which project upwardly toward he top wall 28 of the oven chamber 4 and together with the light assembly 9 serve to divide the duct 66 into two separate cavities—one for each blower wheel 64. The rear of the baffle 68 rests on a bracket 90 (FIG. 2) which extends along the top wall 28 of the chamber 4 where it is attached to one of the longitudinal members 48 of the frame 10. The bracket 90 extends the full length between the end walls 30 and 32 of the oven chamber 4 and forms a shelf on which the discharge panel 82 of the baffle 68 rests beyond the slot 84 within it. Indeed, the slot 84 opens into the chamber 4 ahead of the bracket 90 and the bracket 90 turns downwardly in the form of a short deflector 92 behind the slot 84.

When the motors 60 are energized, the blower wheels 64 rotate within the air duct 66 and draw air into the duct 66 through the apertures 72 in the lower panel 70 of the baffle 68. While the wheels 64 discharge the air radially, the region of the oblique panel 76 offers the only escape, so the air flows rearwardly over the oblique panel 76 and discharge panel 82, encountering the deflector 86 located behind the slot 84. The deflector 86 turns the flowing air downwardly into the slot 84, whereupon the air immediately encounters the deflector 92 on the bracket 90. The deflector 92 further directs the flowing air downwardly and leaves the air in the region behind it relatively tranquil. The division of the duct 66 by the vanes 88 and light assembly 9 into separate cavities for each blower wheel 64 together with the counter-rotation of the wheels 64 distributes the flow of forced air generally uniformly along the slot 84.

The gas-fired burner 7 (FIGS. 2–4) extends along the top wall 28 of the oven chamber 4 immediately behind the baffle 68. Here the top wall 28 is slightly oblique, sloping downwardly from the region of the duct 66 to the back wall 34. The burner 7 rests on that longitudinal member 48 of the frame 10 to which the baffle bracket 90 for the deflector 92 is attached. The burner 7 is a standard article of commerce, being sold on the market as an infrared burner.

Basically, the burner 7 includes (FIGS. 2–4) a metal housing 100 which encloses a plenum 102 and a succession of ceramic burner tiles 104 carried by the housing 100 in front of the plenum 102. The housing 100 extends nearly the full length of the oven chamber 4, that is from the left end wall 30 to the right end wall 32, and at its one end is fitted with a supply pipe 106 which projects through the right end wall 32 into the equipment compartment 44 where it is connected to a source of flammable gas—actually a combustible mixture of a gaseous fuel and air. The combustible mixture passes through the pipe 106 and into the plenum 102 at a slightly elevated pressure and leaves the plenum 102 through small apertures in the tiles 104. When ignited, the combustible mixture burns within the oven chamber 4 along the exposed faces of the tiles 104. The combustion elevates the temperature of the tiles 104 sufficiently to enable them to actually glow. Whether the tiles 104 glow or not, the burner 7 produces infrared radiation which is directed into the oven chamber 4 generally toward the center of the chamber 4 owing to the inclination of the top wall 28.

In this regard, the exposed faces of the tiles 104 lie essentially in the plane of the oblique rear section of the top wall 28 (FIG. 2), and as such assume the oblique orientation of that section of the top wall 28. Moreover, the exposed faces of the tiles 104 are offset from the slot 84 in the baffle 68, and as such are elevated above the slot 84. Hence, the air discharged from the slot 84 does not flow over the faces of the tiles 104, but is instead directed essentially in the same direction as the direction in which the combustible mixture is discharged from the tiles 104. The deflector 92 on the bracket 90 for supporting rear of the baffle 68 further diverts the fast-flowing air stream leaving the slot 84 from flame along the faces of the tiles 104. In effect, the tiles 104 and the combustion which occurs along them are isolated in a recessed section of the oven chamber 4, and this isolation enables the combustion to sustain itself without disturbance from the airstream generated in the air duct 66.

The isolation is particularly significant during ignition of the burner 7. Ignition occurs along the right end wall 32 immediately below the face of the first tile 104. Here the end wall 32 is fitted with a pair of electrodes 110 (FIG. 3), one of which is an enricher tube 112 through which a small quantity of gaseous fuel flows when the burner 7 is energized. Indeed the gap between the electrodes 110 exists between the open end of the enricher tube 112 and the end of the other electrode 110, so that when an elevated potential is impressed across the electrodes 110, the spark that it creates between the electrodes 110 ignites the gas flowing from the enricher tube 112 and the small flame so produced ignites the combustible mixture that flows out of the tiles 104, thus initiating combustion along the faces of the entire complement of tiles 104.

The light assembly 9 lies within the air duct 66 between the two blower wheels 64. It includes (FIGS. 2, 5 & 6) a light box 116 which is suspended from the top wall 28 of the oven chamber 4 with thumb nuts so that it is easily detached from the top wall 28 and removed from the chamber 4. The light box 116 has metal side walls which register with the margins of the cutout 74 in the lower panel 70 of the baffle 68. The upper end of the light box 116 opens into the air channel 50 above the oven chamber 4, so that air circulated through the channel 50 by the fan 52 will to a measure cool the interior of the box 116. The lower end of the light box 116 lies essentially in the plane of the lower panel 70 for the baffle 68 and as such fills the cutout 74 in the baffle 68. The lower end is closed by a lens 118 formed from a heat resistant glass, such as Pyrex glass.

The light assembly 9 also includes lamp sockets 120 which are located within the light box 116, but are attached to one of the longitudinal member 48 that lies along the air channel 50. The sockets 120 receive and hold electric lamps 122, which may be halogen bulbs. The lamps 122, owing to the configuration and location of the light box 116, illuminate the oven chamber 4 in the forward regions of the rotisserie 8, so as to provide an effective display of the food carried by the rotisserie 8, but cast very little illumination on the end walls 30 and 32 and back wall 34 of the oven chamber 4.

Being isolated from the oven chamber 4, the lamp sockets 120 and lamps 122 operate at relatively moderate temperatures. Furthermore, the lamps 122 remain free of grease and thus do not need to be cleaned at periodic intervals. Grease will accumulate on the lens 118, but in no greater amounts than on other surfaces exposed to the oven chamber 4, and the lens 118 is easily cleaned with these other surfaces. Certainly, cleaning the lens 118 requires less effort than cleaning a lamp set into a socket. Should either of the lamps 122 break, their fragments will remain in the light box 116 and not contaminate food in the oven chamber 4. To replace the lamps 122, one must first remove the baffle 68, by withdrawing it through the opening normally occupied by the door 40. Then one removes the light box 116 by loosening the thumb screws that hold it in place. This exposes the lamps 122 which are easily removed from their sockets 120.

Figure 9:
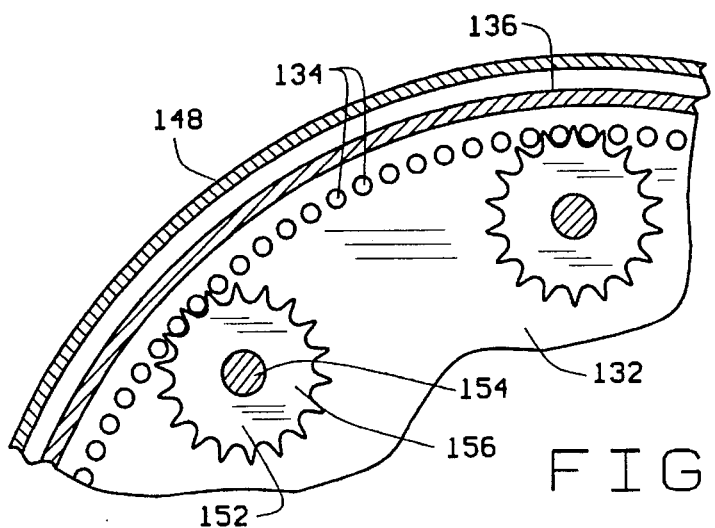
FIG. 9 is a fragmentary sectional view of the rotisserie taken along line 9—9 of FIG. 8 and illustrating the mechanism for rotating spits.
Figure 10:
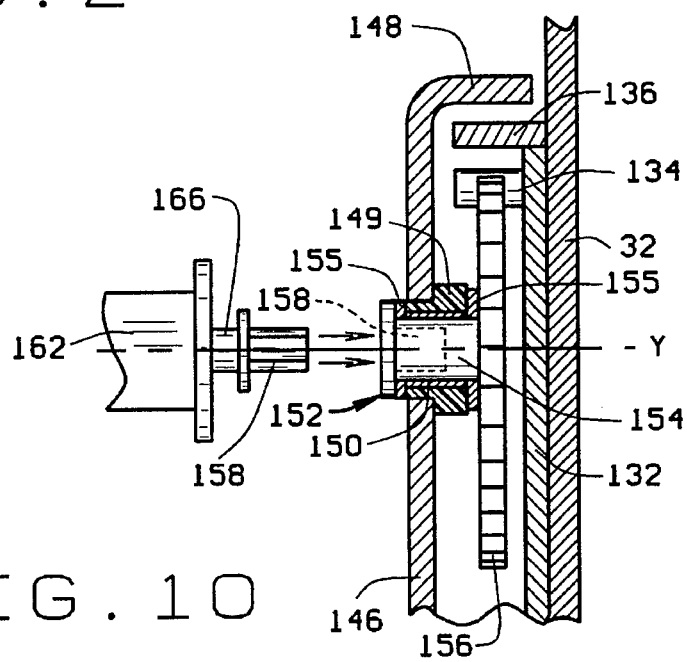
FIG. 10 is a fragmentary sectional view of the rotisserie taken along line 10—10 of FIG. 8.

The rotisserie 8 supports the food, which may be chicken, within the oven chamber 4, and transports each item of food so supported in an orbital path around the axis X. It also rotates each item around a remote axis Y which is offset from the major axis X, so that each orbital revolution exposes a different surface of the food item to the tiles 104 of the burner 7. The rotisserie 8 includes (FIGS. 2 & 8–10) an axle 126 which rotates in bearings 128 mounted on the end walls 30 and 32 of the oven chamber 4, thereby establishing the major axis X of rotation. The axle 126 extends through the right end wall 32 and into the equipment compartment 44 where it is fitted with a relatively large sprocket 130. In addition to the bearing 128, the right end wall 32 carries a pin plate 132 having pins 134 (FIG. 9) arranged at equal circumferential intervals around the axis X—indeed, with the axis X serving as the center of the circle formed by the pins 134. The pins 134 lie parallel to the axis X and project only a short distance—perhaps one inch—beyond the end wall 32 (FIG. 10). In effect, the pins 134 form a ring gear. Finally the end wall 32 supports a circular shroud 136 which encircles pins 134, lying concentric with the pin circle and parallel to the axis X.

The axle 126 carries a drive wheel 138 and a slave wheel 140 within the oven chamber 4, the former being adjacent to the right end wall 32 and the latter adjacent to the left end wall 30. Each wheel 138 and 140 includes a hub 142 (FIG. 8) which fits over the axle 126 with minimum clearance so that it is for all intents and purposes concentric to the axle 126. The hub 142 contains a set screw 144 which when turned downwardly enters a socket in the axle 126 and prevents hub 142, and its wheel 138 or 140, of which it is a part, from rotating on the axle 126. In addition to the hub 142, each wheel 138 and 140 contains a disk 146 which is fastened securely to the hub 142 such that it lies in a plane perpendicular to the major axis X. The disk 146, which is solid, although of relatively thin stainless steel plate, extends outwardly to within a few inches of the bottom wall 26, top wall 28, back wall 34, and the door 40, all of which enclose the oven chamber 4. At its periphery the disk 146 of the drive wheel 138 turns toward the right end wall 32 in the form of an axially directed flange 148, while the disk 146 of the slave wheel 140 turns toward the left end wall 30 in the form of another axially directed flange 148. The flanges 148 of the two wheels 138 and 140 are substantially equal in diameter and are preferably produced in a spinning operation. The flange 148 on drive wheel 138 encircles the shroud 136 that in turn surrounds the pins 134 on the pin plate 132 (FIG. 10).

The wheels 138 and 140 as they rotate slowly within the oven chamber 4 on the axle 126 experience different temperatures, since the upper regions of the oven chamber 4 is hotter than the lower regions, and the intensity of the infrared radiation is greater in the upper region as well. Even though the disks 146 are essentially solid, yet of relatively thin plate, they do not warp or otherwise undergo significant distortion as a consequence of the temperature differentials within them. They remain essentially planar and perpendicular to the axis X. This stability derives from the integral flanges 148 which rigidify the disks 146 and enable them to withstand thermal variations without distortion.

The drive wheel 138 contains bushings 149 which are fitted securely to it, and each bushing 149 in turn contains a journal bearing 150 (FIG. 10). The bearings 150, which may number eight in all, lie at equal radii from the axis C and at equal circumferential intervals, with their axes parallel to the major axis X of rotation. Indeed, the bearings 150 establish the remote axes Y about which the food items rotate as the food undergoes orbital movement. Each bearing 150 carries a spit drive 152 including a journal 154 which fits into one of the bearings 150 and a gear 156 which is attached to the journal 154 behind the wheel 138—indeed, within the confines of its flange 148. At its opposite end the drive 152 has a hexagonal socket 158 which opens out of it along the remote axis Y about which the drive 152 rotates. The spit drive 152 is confined axially in its journal bearing 150 by thrust bearings 155. The teeth on the gears 156 of the spit drives 152 are configured to mesh with and indeed mesh with the pins 134 on the pin plate 132 (FIG. 9). Thus, when the drive wheel 138 rotates with the axle 126, the gears 156 for the spit drives 152 follow the ring gear formed by the pins 132 and rotate by reason of the engagement. The arrangement is such that each spit drive 152 undergoes several revolutions for each revolution of the drive wheel 138, and the number of revolutions does not equal an integer.

The slave wheel 140 in its disk 146 has apertures 160 arranged at the same radius and same circumferential intervals as the bearings 150 in the drive wheel 138. Indeed, for every bearing 150 in the drive wheel 138 a corresponding aperture 160 exists in the disk 146 of the slave wheel 140 along the axes Y for that bearing 150. Thus, the bearings 150 and apertures 160 are in axial alignment.

Figure 11:
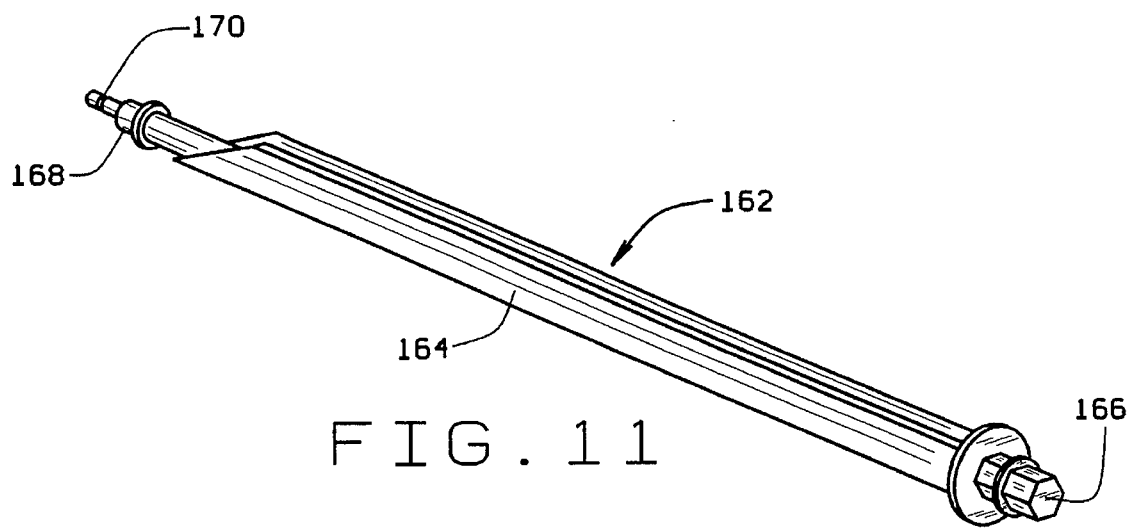
FIG. 11 is a perspective view of a spit forming part of the rotisserie.

The rotisserie 8 also has removable spits 162 which are supported on the drive wheel 138 and slave wheel 140 along the remote axes Y and as such span the space between the two wheels 138 and 140. Each spit 162 includes (FIG. 11) a shank 164 which occupies essentially the full distance between the disks 146 of the two wheels 138 and 140, a head 166 at one end of the shank 164 and a pin 168 at the other end of the shank 164—all lying along one of the remote axes Y when the spit 162 is supported on the two wheels 138 and 140. The shank 164 in cross section is configured to fit through the food which is to be cooked without the food rotating on the shank 164. As such, it may be a simple angle member. The head 166 is configured to fit into the socket 158 of one of the spit drives 152 so it will rotate with the spit drive 152 about the remote axis y. The pin 168 is small enough to fit easily into one of the apertures 160 in the slave wheel 140—indeed, the aperture 160 which aligns with the spit drive 152 into which the head 166 for the spit 162 fits. When so fitted, the pin 168 rotates in the aperture 160 with little resistance. Actually, the shank 164, when the head 166 of its spit 162 is engaged with a spit drive 152, terminates somewhat short of the slave wheel 140, leaving some of the pin 168 exposed, with that portion of the pin 168 slightly exceeding the length of the head 166. This enables one to disengage the head 166 from the spit drive 152 simply by moving the spit 162 axially away from the drive wheel 138 a distance equalling the length of its head 166. The pin 168 merely moves further into the aperture 160 in the slave wheel 140. The pin 168, however, contains an annular groove 170, the width of which slightly exceeds the thickness of the disk 146 to the slave wheel 140. When the head 166 of the spit 162 lies fully within the socket 158 of the spit drive 152, the groove 170 in the pin 168 aligns with the disk 146 of the slave wheel 140 and the groove 170 in the pin 168 receives a segment of the margin for the aperture 160. This prevents the spit 162 from undergoing any axial displacement—unless of course it is manipulated manually to bring its pin 168 into perfect alignment with the aperture 160 into which the pin 168 fits. Indeed, that manipulation is required to remove the spit 162 from the two wheels 138 and 140.

Thus, when the spits 162 are engaged with the drive wheel 138 at the spit drives 152 on that wheel and with the slave wheel 140 at the apertures 160 of that wheel, and the wheels 138 and 140 rotate with the axle 126, the spits 162 will move in an orbital path through the oven chamber 4 with of course the primary axis X being the axis of rotation. The rotation is such that the spits 162 rise immediately behind the door 40, and encounter the forced flow of air discharged from the air duct 66 at the slot 84 as they approach and pass over top center. Thereafter they pass through the greater intensity of radiation emitted from the burner 7. Food on the spits 162 will of course encounter the forced air and see the fullest radiation in that order. As the spits 162 undergo the orbital movement, they also rotate about their own axes Y, and the rotation is such that no spit 162 will be in the same angular position after it completes a full revolution.

Finally the rotisserie 8 has a gear motor 172 (FIGS. 8 & 12) which furnishes the power for rotating the axle 126 and the two wheels 138 and 140 within the oven chamber 4. The gear motor 172 is located within the equipment compartment 44 beneath the end of the axle 126 and the sprocket 130 on that end, it being fastened firmly to a bracket which is in turn firmly attached to the right end wall 32 of the oven chamber 4. The gear motor 172 consists of an electric motor and a gear box which effects a substantial reduction in the speed of rotation, the power being delivered through a shaft projected from the gear box. That shaft carries a small sprocket 174 which lies in the plane of the larger sprocket 130 on the end of the axle 126, and the two sprockets 130 and 174 are connected through a roller chain 176. Thus, the torque delivered by the gear motor 172 is transmitted to the axle 126 through the chain 176. The electric motor of the gear motor 172 operates on direct current, and as a consequence its speed and the speed of the axle 126 are varied with considerable precision simply by varying the electrical potential impressed across the direct current motor. By the same token, the stall torque may be controlled with considerable precision and should be set such that it is below that at which the gears in the gear box will be damaged.

The bottom of the oven chamber 4 forms a basin which holds water in a pool perhaps about one inch deep (FIG. 2). To this end, the bottom wall 26 of the oven chamber 4 is impervious as are the lower regions of the two end walls 30 and 32, the back wall 34 and the front panel 36, and they are joined to each other and to the bottom wall 26 at waterproof joints. The bottom wall 26 contains a drain 182 provided with a valve which is manually operated to drain the water from the bottom of the oven chamber 4. The bottom wall 26 also contains a standpipe 184 which rises about 1½ inches above the bottom wall 26 and establishes the maximum depth of the pool in the bottom of the oven chamber 4. As food, such as chicken or some other meat, cooks on the spits 162 of the rotisserie 8, juices flow from it and drop to the pool of water in the bottom of the oven chamber 4 where they collect without smoking or producing a charred crust.

The equipment compartment 44 contains controls, valves and other devices which coordinate the operation of the burner 7 and the rotisserie 8, all to produce uniformly cooked foods under varying conditions.

Much of the equipment compartment 44 is occupied with a fuel supply system 190 (FIG. 12) that delivers a combustible mixture to the supply pipe 106 of the burner 7. The supply system 190 begins at an inlet pipe 192 to which is connected a gas line in the building where the oven A is installed, and that line supplies a gaseous fuel, such as natural gas or propane, to the system 190. The inlet pipe 192 leads to a pressure regulator 194 which reduces the pressure of the gas to a lesser magnitude. From the regulator 194 another pipe 196 delivers the gas to a shut off valve 198 which is operated by a knob exposed at the control panel 24 on the front of the housing 2. Assuming that the shut off valve 198 is open, the gas flows through still another pipe 200 to a primary solenoid valve 202 which is connected to a booster solenoid valve 204 through a short connecting pipe 206. When open, the main solenoid valve 202 directs the gas to the booster valve 204 and also to a mixing chamber 208 that is connected to the burner supply pipe 106. In this regard, the connecting pipe 206 contains a T-fitting to which a main delivery pipe 210 is connected, and the pipe 210 leads to and discharges into the mixing chamber 208. The booster valve 204 is also connected to the mixing chamber 208 through a secondary delivery pipe 212. The arrangement is such that the primary valve 202, when open, will deliver considerably more gas to the mixing chamber 208 than will the booster valve 204. Typically the heating value of the gas delivered to the mixing chamber 208 for a unit of time when only the primary valve 202 is open amounts to 42000 Btu, but when the booster valve 204 is also open it directs additional gas having a heating value of 8000 Btu into the chamber 208, so that with both valves 202 and 204 open, the mixing chamber 208 will receive gas having a heating value of 50,000 Btu during the unit of time.

The mixing chamber 208 is enclosed by a cylindrical housing and at its upper end is connected with the supply pipe 106 that leads to the plenum 102 of the burner 7. The lower end of the mixing chamber 208 is connected with a combustion blower 214 (FIG. 12) which delivers enough air to the mixing chamber 208 to create a combustible mixture with the gas that is delivered through the solenoid valves 202 and 204. At its inlet, the blower 214 has an adjustable damper 216 for controlling the amount of air drawn into the blower 214 and delivered by the blower 214 to the mixing chamber 208. Thus, by manipulating the damper 216 one controls the air-fuel ratio in the plenum 102 of the burner 7. Typically, the damper 216 is set such that the mixture contains excess air when only the primary valve 202 delivers the fuel gas and is slightly rich in fuel when both valves 202 and 204 deliver the fuel gas. The primary valve 202 also delivers a small amount of gas to the enricher tube 112 through a small supply tube 218.

The temperature of the air within the cooking chamber 4 ultimately determines how long the burner 7 remains in operation with gas furnished through the primary valve 202, and that temperature is monitored with a temperature sensor 220 which is mounted on the right end wall 32 of the oven chamber 4, projecting from the equipment compartment 44 into the air duct 66. The sensor 220 produces an electrical signal.

In addition, the equipment compartment 44 contains an ignition module 222 for producing a spark across the electrodes 110 at the face of the first tile 104 for the burner 7. The ignition module 222 is connected by a wire to the electrodes 110. The cavity 44 also contains a rectifier for converting alternating current to direct current, with the direct current produced by the rectifier being delivered to the direct current motor of the gear motor 172. But the voltage delivered by the rectifier may be varied with a potentiometer 224 which is manually adjusted from the control panel 24 at the front of the housing 2—or may be controlled automatically as is the burner 7. Typically, the gear motor 172 rotates the axle 126 at between 3 and 5 rev/min.

The control panel 24 also carries a controller 230 (FIGS. 2 & 12) which has an exposed key pad for entering information required for properly cooking food in the oven chamber 4. Such information may include the temperature at which the food is to be cooked, the time that it is to be cooked, the temperature of the oven chamber 4 during any hold period after the cooking is complete but before the food is removed, and the amount of food to be placed on the spits 162. It will also automatically provide a so-called duty cycle in which the burner 7 operates at greater than normal intensity with the two solenoid valves 202 and 204 open. The controller 230 may be used to establish the speed at which the gear motor 172 operates, and to reduce that speed after the food is cooked. Food Automation-Service Techniques, Inc. (also known as FAST) of Stratford, Conn., manufactures controllers suitable for use as the controller 230 of the oven A.

The operator through the key pad of the controller 230 enters a cooking program into the controller 230 and then when desired sets the program in operation, again through the key pad of the controller 230. Initially the controller 230 opens the primary solenoid valve 202 and it delivers gas to the mixing chamber 208 and also to the enricher tube 112. The gas in the mixing chamber 208 mixes with the air delivered by the blower 214 and the combustible mixture so formed flows into the plenum 102 of the burner 7 and then into the combustion chamber 4 through the tiles 104. The gas from the enricher tube 112 flows into the oven chamber 4 in front of the initial tile 104. At the same time the controller 230 energizes the ignition module 222 so that it impresses a high potential across the electrodes 110—high enough to create a spark in the space between the electrodes 110. That spark ignites the gas flowing from the enricher tube 112, and a small flame develops at the end of the enricher tube 112. That flame in turn ignites the combustible mixture that flows out of the tiles 104. This results in a sustained flame along the faces of the tiles 104, and that flame is hot enough to cause the tiles 104 to glow. The flames together with the glow from the tiles 104 produce infrared radiation which is directed into the oven chamber 4—indeed, toward the path taken by the spits 162 as they pass over top center. Food carried by the spits 162 sees this radiation and is cooked by it.

The flame at the exposed faces of the tiles 104 also heats the air within the oven chamber 4, and that air is circulated by the blower wheels 64 which rotate within the air duct 66. Notwithstanding the circulation, which assumes a substantial velocity at the slot 84 where it leaves the duct 66, the high velocity air does not impinge on the burner tiles 104 and will not extinguish the flame along the tiles 104 or even the much more delicate flame at the enricher tube 112.

The program implemented by the controller 230 may call for more intense cooking during part of the time the food is in the oven chamber, and to achieve this higher intensity the controller 230 opens the booster valve 204, thus delivering more gas to the plenum 102 of the burner 7. This results in a flame of greater intensity and higher temperature along the faces of the tiles 104.

The controller 230 monitors the signal produced by the temperature sensor 220 and should that temperature rise above the set temperature by a prescribed amount, the controller 230 will close the primary solenoid valve 202. On the other hand, should it drop below the set temperature by a prescribed amount, the controller 230 will open the primary solenoid valve 202. In this way the controller 230 maintains a generally uniform temperature within the oven chamber 4.

When the food is fully cooked, the controller 230 may establish a hold environment within the oven chamber 4—one that keeps the food warm and displays with a slow rotation of the spits 162 around the primary axis X, perhaps as low as ½ rev/min. This prevents juices from and coatings on foods such as chicken from creating circular stripes.

In lieu of the solid back walls 20 and 34 at the rear of the cooking chamber 4, the housing 2 and oven chamber 4 may be provided with a common opening that is normally closed by a glass door 40. Indeed, the back walls 20 and 34 are constructed such that a section of each may be removed and replaced with a door 40.

This invention is intended to cover all changes and modifications of the example of the invention herein chosen for purposes of the disclosure which do not constitute departures from the spirit and scope of the invention.

What is claimed is:

1. A cooking oven comprising: a housing having walls that enclose an oven chamber; food holders mounted on the housing within the oven chamber for supporting food within the chamber; a gas-fired burner located in the housing and having a face exposed to the oven chamber at one of the walls and exposed to food supported on the food holders in the oven chamber, the burner being capable of supporting along its face a flame that creates infrared radiation; a duct located in the housing and having an inlet exposed to the oven chamber and an outlet located along the same wall as that along which the face of the burner is located; and a blower located in the duct for circulating air through the duct and the oven chamber, with the air being drawn into the duct at the inlet and discharged at the outlet; the outlet for the duct being oriented to direct air in the same direction as that toward which the face of the burner is presented, and without having the air flow across or impinge upon the face of the burner with enough intensity to extinguish the flame that is supported along the face of the burner.

2. A cooking oven according to claim 1 wherein the burner has a plenum and tiles located in front of the plenum, the face of the burner being on the tiles; and wherein the oven further comprises a mixing chamber where a gaseous fuel is mixed with air, the mixing chamber being connected to the plenum of the burner.

3. A cooking oven according to claim 2 wherein the tiles of the burner contain apertures which extend from the plenum to the faces of the tiles so that the mixture of fuel and air will pass through the tiles.

4. A cooking oven according to claim 1 and further comprising a baffle located along that wall along which the face of the burner is located and together with that wall forming the duct.

5. A cooking oven according to claim 1 wherein the baffle is attached to the wall along which the face of the burner lies, but is easily detached from that wall.

6. A cooking oven according to claim 1 and further comprising: a channel located in the housing outside the cooking chamber and a fan for directing air through the channel; and wherein the light box opens into the channel so that its interior is cooled with air passing through the channel.

7. A cooking oven according to claim 1 and further comprising a rotisserie of which the food holders are part, and wherein the rotisserie moves the food holders in an orbital path, with each holder first encountering the airstream discharged from the duct and immediately afterward the primary concentration of radiation from the burner.

8. A cooking oven according to claim 1 and further comprising a channel located in the housing outside of the cooking chamber, and a fan located in the housing such that it directs air through the channel; and wherein the blower includes a motor that is located in the channel of the housing and a blower wheel that is located in the oven chamber and is rotated by the motor, whereby the circulating air cools the motor.

9. A cooking oven comprising: a housing having walls that enclose an oven chamber, one of the walls being a top wall that extends over the oven chamber; a baffle located along the top wall and together with the top wall serving to enclose an air duct, the baffle having a discharge opening which is presented downwardly and opens into the oven chamber; a blower located in the air duct remote from the discharge opening for drawing air from the oven chamber into the duct and discharging it downwardly through the opening and into the oven chamber; a gas-fired burner located in the housing above the oven chamber and having a face that lies along the top wall where it is presented downwardly toward the oven chamber and out of the path of the air discharged from the discharge opening in the duct, the burner being capable of supporting along its downwardly presented face a flame that produces infrared radiation; and food holders mounted on the housing within the oven chamber for supporting food in the oven chamber.

10. A cooking oven according to claim 9 wherein the downwardly presented face of the burner is located generally adjacent to the opening in the baffle.

11. A cooking oven according to claim 10 and further comprising a deflector located along the opening for deflecting air downwardly as the air leaves the opening.

12. A cooking oven according to claim 10 wherein the burner and opening are elongated and lie generally parallel to each other.

13. A cooking oven according to claim 10 wherein the burner includes a burner housing that forms a plenum and porous tiles located on the housing below the plenum, the downwardly presented face of the burner being along the tiles.

14. A cooking oven according to claim 10 wherein the deflector is located between the opening and the face of the burner and projects below both.

15. A cooking oven according to claim 9 and further comprising a light box located in the duct and having a lens that is exposed through the baffle to the oven chamber, and a lamp located in the light box to illuminate the oven chamber.

16. A cooking oven according to claim 15 where the blower is one of two blowers located in the duct, and the light box is located between the blowers.

17. A cooking oven according to claim 9 and further comprising a fuel supply system connected between the plenum and an inlet designed to be coupled with a source of gaseous fuel, the fuel supply system including a primary valve in communication with the inlet and the plenum so that when open it allows the gaseous fuel to flow into the plenum, a booster valve in communication with the primary valve and the plenum so that when it is open and the first valve is open more gaseous fuel will flow through the booster valve to supplement the fuel supplied through the primary valve and thus produce combustion of greater intensity along the face of the burner.

18. A cooking oven according to claim 17 wherein the burner also includes tiles which lie between the plenum and the oven chamber with the surface along which combustion exists being on the tiles, the tiles containing openings which place the surface and the plenum in communication so that the gaseous fuel will flow through the tiles to the surface.

19. A cooking oven according to claim 17 and further comprising a mixing chamber in communication with the plenum and with the primary and booster valves such that the valves when open permit the gaseous fuel to flow into the mixing chamber; and wherein a blower is connected to the mixing chamber to discharge air into the mixing chamber, whereby the air mixes with the gaseous fuel in the mixing chamber to produce a combustible mixture that flows into the plenum of the burner.

20. A cooking oven according to claim 17 and further comprising a channel in the housing outside the oven chamber, and a fan for directing air through the channel; and wherein the light box opens into the channel so that its interior is to a measure cooled by the air flowing through the channel.

21. A cooking oven according to claim 9 and further comprising a rotisserie of which the food holders are part, and wherein the rotisserie moves the food holders in an orbital path, with each holder first encountering the airstream discharged from the duct and immediately afterward the primary concentration of radiation from the burner.

22. A cooking oven according to claim 21 where the rotisseries comprises: first and second wheels located in the oven chamber for rotation about a common axis, at least one of the wheels having a generally solid disk and a flange directed generally axially from the disk to rigidify the disk and prevent excessive distortion of it by reason of temperature differentials in the disk; a motor located in the housing and connected to the wheels for rotating the wheels, the food holders being attached to the wheels such that they move around the axis when the wheels rotate.

23. A cooking oven according to claim 22 and further comprising a device for varying the speed of the motor.

24. A cooking oven according to claim 23 wherein the flange is formed integral with the disk of said one wheel at the periphery of the disk.

25. A cooking oven according to claim 24 wherein the flange is derived from a metal spinning operation.

26. A cooking oven comprising: a housing containing walls that enclose an oven chamber, the walls including a top wall, a bottom wall, and end walls extended between the top and bottom walls at the ends of the chamber; a gas-fired burner located in the housing along the top wall and having tiles that provide a downwardly presented face that is exposed to the oven chamber; food holders located in the oven chamber for supporting food; a baffle located in the oven chamber along the top wall to establish with that wall an air duct having a discharge opening that is presented downwardly; a blower located on the housing and in the duct to draw air into the duct and discharge it downwardly from the opening in the duct to circulate air within the oven chamber such that the air passes over the food holders and any food supported on the food holders; a deflector located within the oven chamber between the opening in the duct and the burner, the deflector being configured to direct air discharged from the duct away from the burner, all such that the velocity of the air in the region of the burner is low enough to prevent the circulating air from extinguishing the flame along the face of the burner.

27. A cooking oven comprising: a housing containing walls that enclose an oven chamber, the walls, including a top wall, a bottom wall, and end walls extended between the top and bottom walls at the ends of the chamber: a gas-fired burner located in the housing along the top wall and having tiles that provide a downwardly presented face that is exposed to the oven chamber; food holders located in the oven chamber for supporting food; a baffle located in the oven chamber along the top wall to establish with that wall an air duct having a discharge opening that is presented downwardly; a blower located on the housing and in the duct to draw air into the duct and discharge it downwardly from the opening in the duct to circulate air within the oven chamber such that the air passes over the food holders and any food supported on the food holders; the interior of the oven chamber being configured such that the velocity of the air in the region of the burner is low enough to prevent the circulating air from extinguishing the flame along the face of the burner; a light box located in the duct and having at its lower end a lens which is exposed to the over chamber through the baffle; and a lamp in the light box for illuminating the oven chamber.

* * * * *